United States Patent [19]

Van Zanten et al.

[11] Patent Number: 5,244,258

[45] Date of Patent: Sep. 14, 1993

[54] ANTI-SKID BRAKE CONTROL SYSTEM WHICH OPTIMIZES FREQUENCY OF PRESSURE BUILD-UP PULSES

[75] Inventors: Anton Van Zanten, Ditzingen; Friedrich Kost, Stuttgart; Wolf D. Ruf, Waldstetten, all of Fed. Rep. of Germany

[73] Assignee: Robert Bosch GmbH, Stuttgart, Fed. Rep. of Germany

[21] Appl. No.: 445,739

[22] PCT Filed: Apr. 27, 1988

[86] PCT No.: PCT/EP88/00353

§ 371 Date: Jul. 10, 1991

§ 102(e) Date: Jul. 10, 1991

[87] PCT Pub. No.: WO88/09276

PCT Pub. Date: Dec. 1, 1988

[30] Foreign Application Priority Data

May 21, 1987 [DE] Fed. Rep. of Germany ....... 3717005

[51] Int. Cl.$^5$ ............................................. B60T 8/32
[52] U.S. Cl. ........................................ 303/100; 303/96
[58] Field of Search ............... 303/100, 103, 104, 105, 303/106, 107, 109, 110, 93; 364/426.02

[56] References Cited

U.S. PATENT DOCUMENTS

| | | | |
|---|---|---|---|
| 3,719,398 | 3/1973 | Takayama et al. | 303/96 |
| 3,918,766 | 11/1975 | Klatt | 188/181 A |
| 4,036,536 | 7/1977 | Quon | 303/96 |
| 4,585,280 | 4/1986 | Leiber | 303/100 |
| 4,647,115 | 3/1987 | Leiber et al. | 303/106 |
| 4,778,025 | 10/1988 | Sakaguchi et al. | 180/197 |
| 5,029,949 | 7/1991 | Buschmann et al. | 303/96 |

FOREIGN PATENT DOCUMENTS

| | | |
|---|---|---|
| 2422147 | 11/1974 | Fed. Rep. of Germany . |
| 2063944 | 1/1977 | Fed. Rep. of Germany . |
| 3618691 | 12/1986 | Fed. Rep. of Germany . |
| 1018548 | 1/1966 | United Kingdom . |

OTHER PUBLICATIONS

Patent Abstrs. of Japan, vol. 9, No. 249—Oct. 5, 1985.
Bosch Technische Berichte (Feb. 1982) "Antiskid System (ABS) for Passenger Cars", H. Leiber et al. pp. 65-70.

Primary Examiner—Matthew C. Graham
Attorney, Agent, or Firm—Felfe & Lynch

[57] ABSTRACT

A brake pressure controller increases the brake pressure in pulsed increments separated by pressure maintenance phases. During each maintenance phase, an evaluation circuit generates a stability criterion for each wheel which depends on the wheel acceleration and the slippage. If the criterion indicates that the wheel is stable, a pressure build-up pulse is generated. If the wheel is in dynamic transition, the pressure is maintained. If instability or limited stability is indicated, brake pressure is reduced. The system serves to maximize frequency of the build-up pulses for a stable running wheel.

10 Claims, 4 Drawing Sheets

ANTI-SKID BRAKE CONTROL SYSTEM WHICH OPTIMIZES FREQUENCY OF PRESSURE BUILD-UP PULSES

BACKGROUND OF THE INVENTION

The present invention relates to an anti-skid brake control system for a motor vehicle of the type comprising a speed sensor associated with a vehicle wheel for producing a signal representative of the wheel speed $V_R$; an evaluation circuit responsive to the wheel speed signal for determining the wheel acceleration $V_R$, the approximate vehicle speed $V_{Ref}$, and the longitudinal wheel slippage $\lambda$, and for producing brake pressure control signals in response thereto; and brake pressure control means, responsive to the aforesaid control signals, for controlling the brake pressure applied to the vehicle wheel(s). The evaluation circuit and the brake pressure control device are operative to reduce the brake pressure, to maintain the brake pressure at a substantially constant level, and to increase the brake pressure in pulsed increments so as to provide the driver-selected braking force while limiting the longitudinal wheel slippage.

PRIOR ART

The German Patent No. 20 63 944 discloses an anti-skid brake control system having these features. It determines deceleration and acceleration signals ($-b$, $+b$) that are generated in addition to slippage signals and are combined in AND and OR-gates so as to form brake pressure control signals.

SUMMARY OF THE INVENTION

It is an object of the invention to further improve such systems and, in particular, to achieve high pressure build-up frequencies, in case the distance of the pressure from the locking pressure is large, and small pressure build-up frequencies in case the distance is small.

It is an object of this invention to adjust the wheel brake cylinder pressure of a vehicle such that, on the one hand, a highest-possible adhesion coefficient $\mu_B$ is available in the longitudinal direction of the tires and, on the other hand, a high adhesion coefficient $\mu_S$ is available in the transverse direction of the tires.

This is the case when brake slippage values are obtained which are close to the maximum of the $\mu$-slippage curve but do not exceed this maximum.

The slope of the $\mu$-slippage curve has small positive values in this range and the dynamic behavior of the slippage is asymptotically stable. The German patent publication No. 36 18 691 discloses a process which determines the slope of the slippage curve and adjusts the slippage such that the slope of the slippage curve assumes small positive values.

The invention predominantly uses the wheel circumferential speed $V_R$ of the controlled wheels as a measuring value. An embodiment to be described hereinafter also measures the vehicle deceleration in case a supported vehicle reference speed $V_{Ref}$ is to be used.

The brake pressure is adjusted by means of hydraulic valves, the actuating logic of which can assume, for example, the following operational conditions: duration build-up, pulsed build-up with prescribed length of pulse, pressure maintenance, duration reduction.

The wheel speed is sensed and evaluated to digital signals at intervals of 3 ms, for example. The control is carried out in limiting cycles which include an event-controlled pulsed pressure build-up, a pressure reduction, and a maintenance phase leading into the stable range of the slippage curve.

During the pressure maintenance phase following a build-up pulse the following stability criterion is individually monitored for each controlled wheel:

$$P_y = \begin{cases} 0 & \text{for } \Delta\lambda < \Delta\lambda_1 \\ 0 & \text{for } V > b_1, \\ \alpha(b_1 - V)(\Delta\lambda - \Delta\lambda_1) + \beta(\Delta\lambda - \Delta\lambda_1) & \text{otherw.} \end{cases} \quad (1)$$

In this relationship:

$\alpha, \beta, b_1, \Delta\lambda_1$ are constants, $\Delta\lambda = \lambda - \lambda_S$ is the slippage change during a maintenance phase, $\lambda = 1 - V_R/V_{Ref}$ is the actual slippage, $\lambda_S$: actual slippage at the beginning of the maintenance phase, $V = V_R - b_x$ is the difference acceleration, $V_R$ is the wheel circumferential acceleration, and $b_x$ is the vehicle acceleration.

The values $V_{Ref}$ and $b_x$ which are used will be determined in a manner to be described hereinafter.

For values $P_y = 0$ the wheel is definitely stable, therefore a build-up pulse can be formed.

From values $0 < P_y < \text{e.g. } 0.5$ it can be concluded that the wheel is in a dynamic transition; hence, the pressure is maintained. $P_y > 0.5$ suggests instability or limited stability; hence, the wheel brake pressure is reduced. In case the wheel behavior is undisturbed, the above stability criterion can be illustrated in a phase plane of the parameters $V$ and $\Delta\lambda$ (FIG. 1).

The wheel speed $V_R$ and the actual slippage $\lambda$ are determined by the relation $$\frac{\theta}{R_d} V_R = -M_{B\,new} + M_A(\lambda), \quad (2)$$

wherein $\theta$ is the wheel inertia moment, $R_d$ is the dynamic wheel radius, $M_{B\,new}$ is the braking moment in the respective maintenance phase, $M_A$ is the slippage-dependent driving torque.

At the end of the preceding maintenance phase, the wheel was close to the (stable) stationary condition $\lambda_s$ with $\lambda_s = 0$.

At this point in time, $$\frac{\theta}{R_d} V_{RS} = -M_{B\,old} + M_s(\lambda)$$

wherein $V_{RS} = (1 - \lambda_s) \times b_x = \text{constant}$.

Since $\lambda_s << 1$, simplifying is possible:

$$\frac{\theta}{R_d} b_x = -M_{B\,old} + M_s(\lambda) \quad (3)$$

Equation (3) subtracted from Equation (2) and linearized by $\lambda_s$, results in:

$$\frac{\theta}{R_d}(V_R - b_x) = -(M_{Bnew} - M_{Bold}) + \left.\frac{dM_1}{d\lambda}\right|_{\lambda = \lambda_s}(\lambda - \lambda_s).$$

According to the definition the following applies:
$V_R - b_x = V$ and $\lambda - \lambda_s = \Delta\lambda$.

The term $M_{B\ new} - M_{B\ old}$ corresponds to the bounce of moment $\Delta M_B$ at the beginning of the maintenance phase. From this it follows that:

$$\frac{\theta}{R_d} V = -\Delta M_B + \frac{a M_A}{a\lambda}\bigg|_{\lambda=\lambda_s} \cdot \Delta\lambda \quad (4)$$

When eliminating time, the result of Equation (4) in the phase plane is the relationship (qualitatively) illustrated in FIG. 1. In order to allow for delays and idle times in the measurment as well as considering the effects of the valve switching times, a curve minimum maintenance time must be observed after each buildup pulse before the stability test takes effect.

Figure 1:
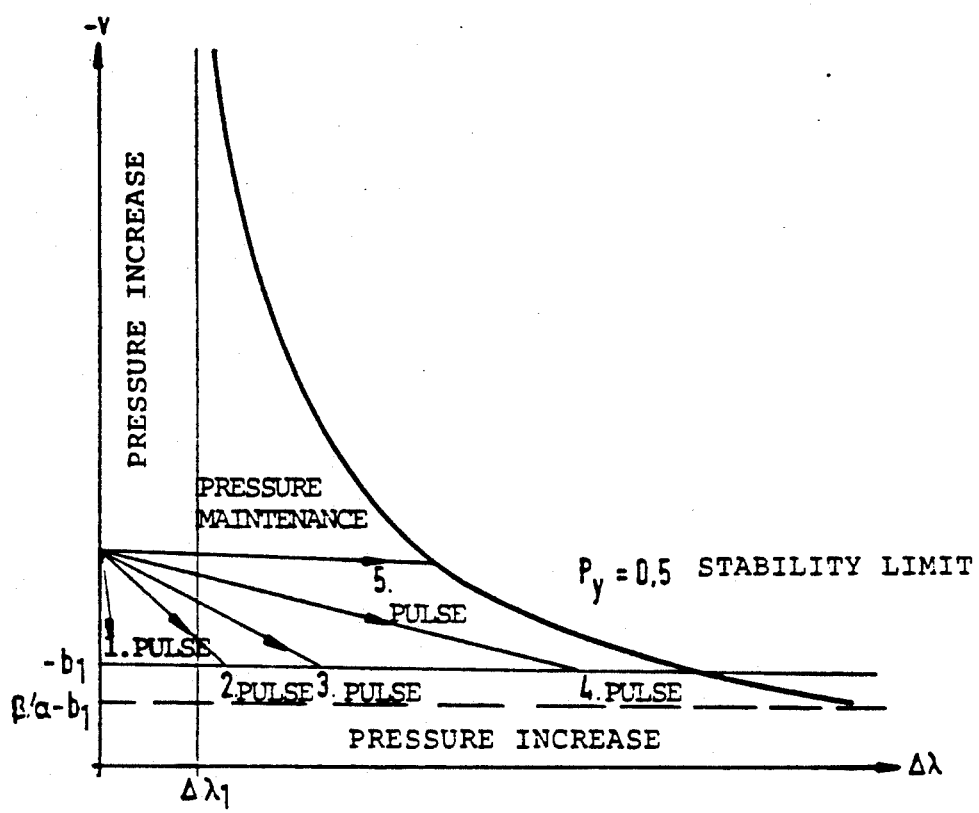
FIG. 1 shows the qualitative representation of the stability criterion in a phase plane of the parameters by V and $\Delta\lambda$.

DETAILED DESCRIPTION OF THE PREFERRED EMBODIMENT $-V$ is shown in FIG. 1 with respect to $\Delta\lambda$ for subsequent pressure build-up pulses. The plane outlined is subdivided in build-up ranges ($0 < V < -b_1$ and $0 < \Delta\lambda < \Delta\lambda_1$), a reducing range (on the other side of $P_y$=e.g. 0.5) and a maintenance range lying in between. As it can be seen, the first pulse is not led out of the definitely stable range ($P_y=0$); the 2nd, 3rd, and 4th pulses, however, are followed by increasingly longer maintenance phases ($0 < P_y < 0.5$). The 5th pulse then leads into the instability range, i.e. to pressure reduction ($P_y \geq 0.5$).

Figure 2:
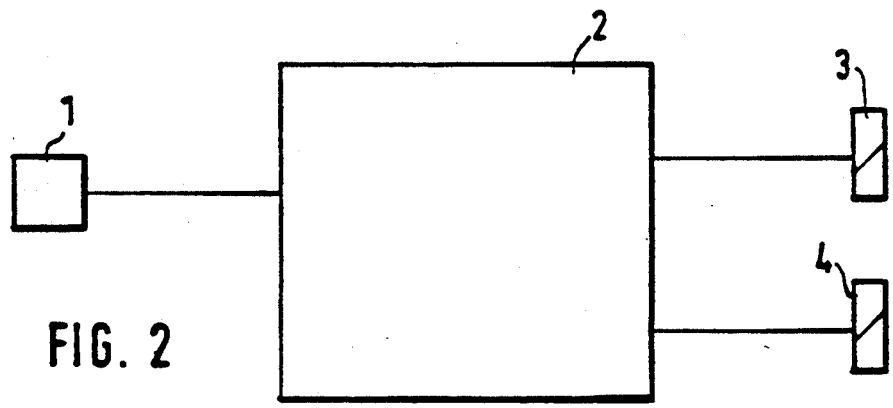
FIG. 2 is a block diagram of an anti-lock brake control.

FIG. 2 is a block diagram of a one-channel anti-lock brake control system (control, i.e. in this case is represented only for one wheel). A sensor for determining the wheel speed is denoted by reference numeral 1, an evaluation circuit in the form of a computer is shown as 2, an inlet valve as 3 and an outlet valve is referenced as 4.

Figure 4:
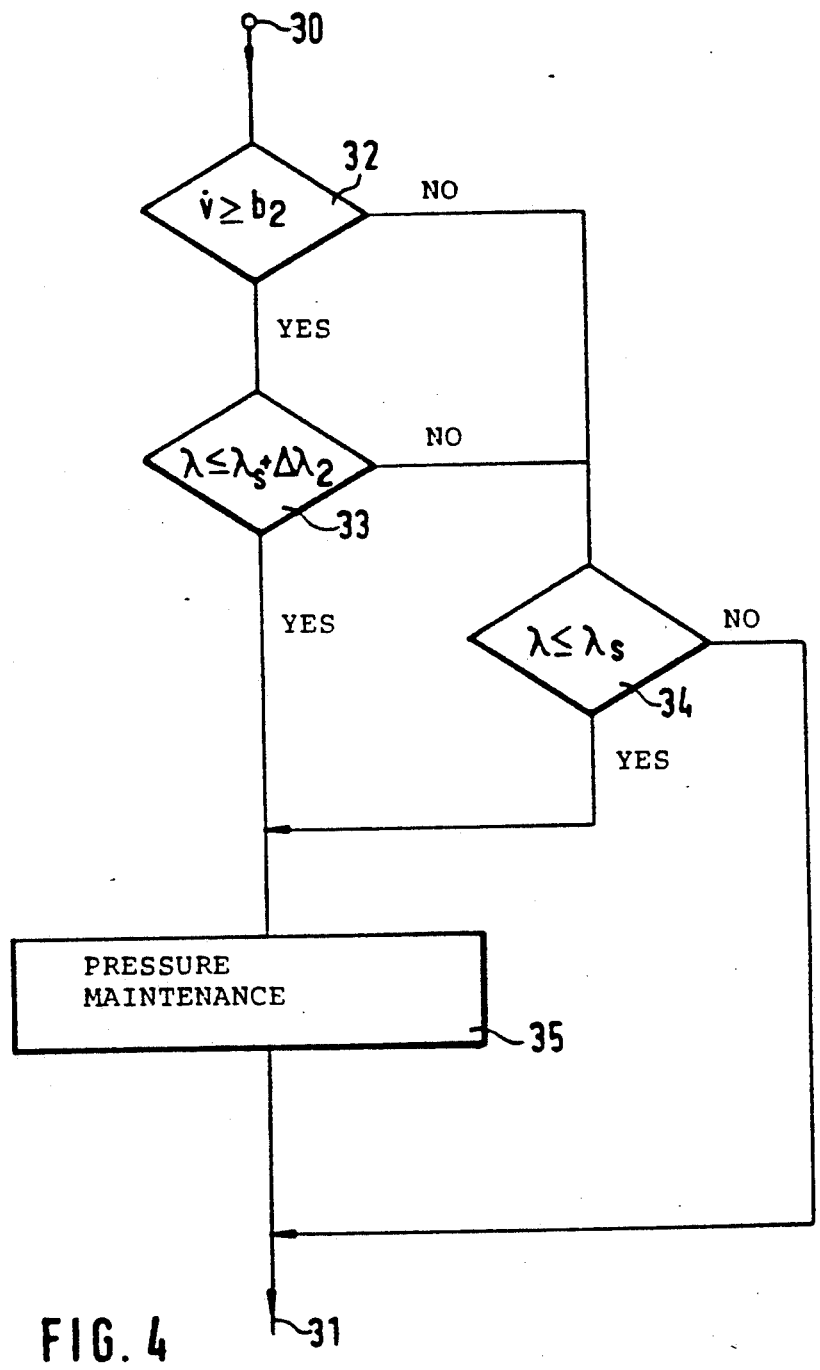
Figure 5:
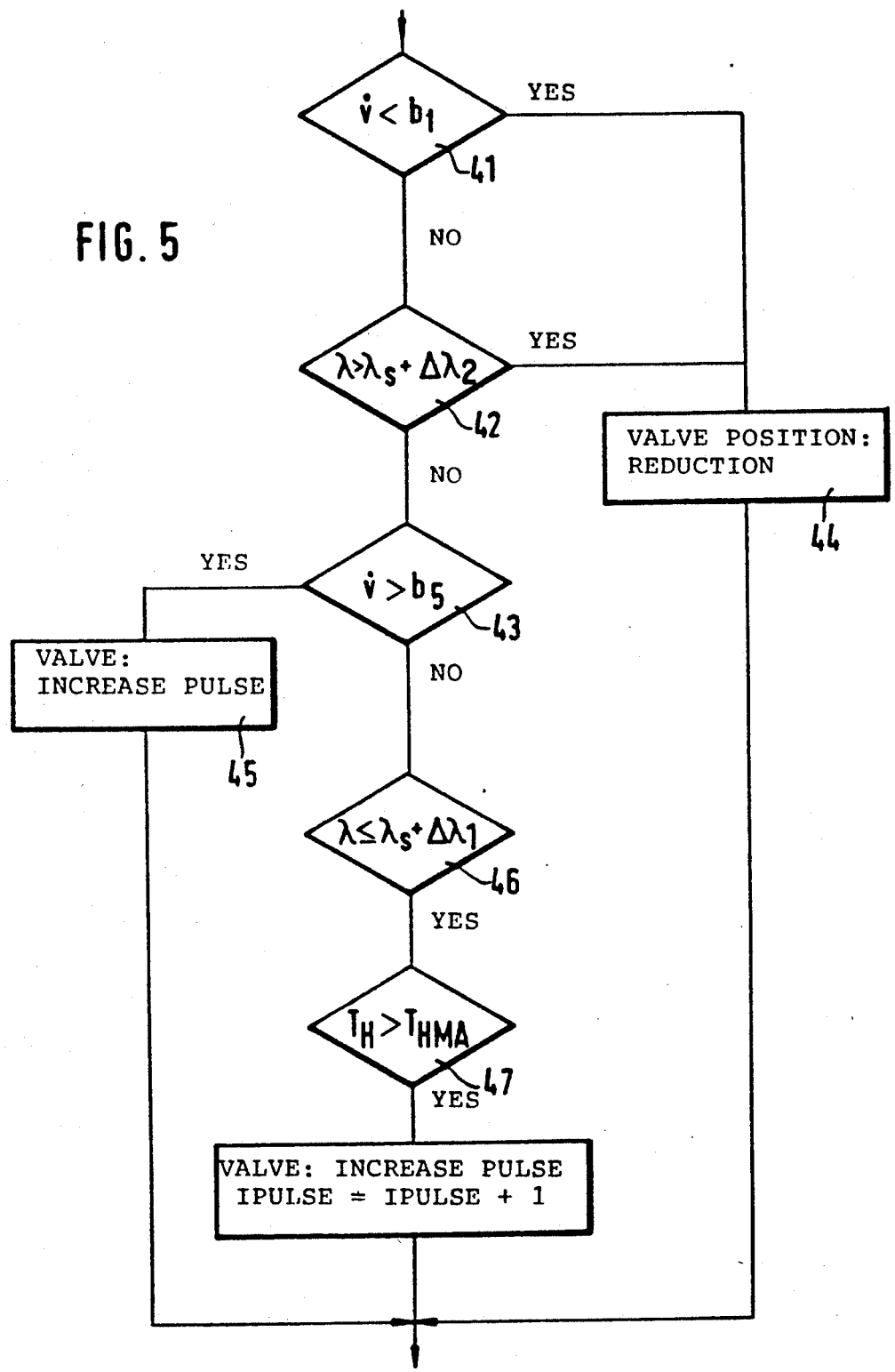

The control algorithm successively passes the conditions "stability check" (FIG. 3), "pressure reduction" (FIG. 4), "reacceleration of the wheel" (FIG. 5).

Figure 3:
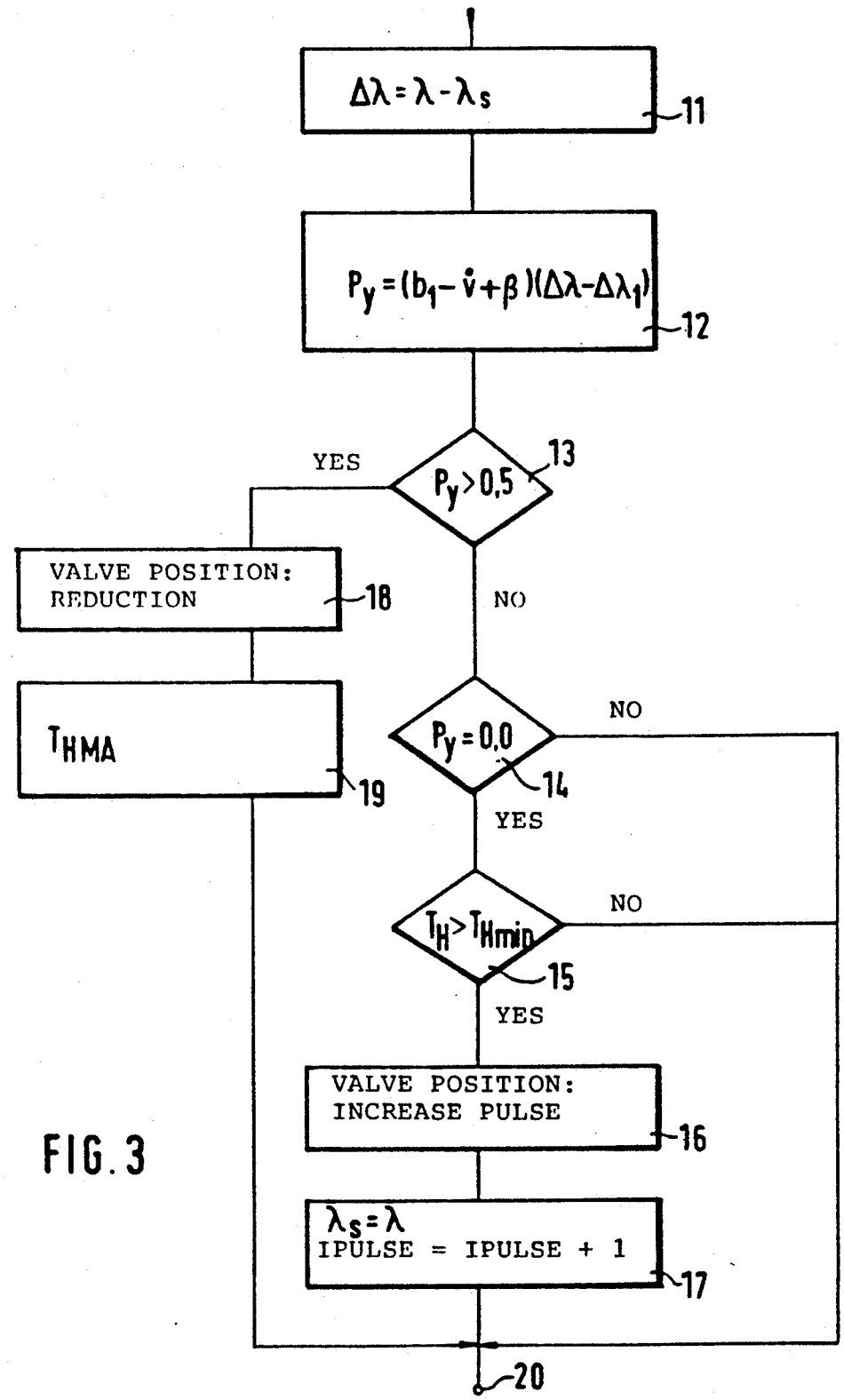
FIGS. 3, 4 and 5 are flow charts for various pressure effects that occur in the system.

In accordance with the invention, the computer realizes in the "stability check" condition instabilities of the wheel during the maintenance phases between two pressure build-up pulses after a preceding pressure reduction according to the program execution of FIG. 3. After the difference $\Delta\lambda$ is formed from the actual slippage value $\lambda$ and the slippage value $\lambda_s$ which was the last one realized as stable (in 11), $P_y$ is formed according to equation (1). If $P_y$ is greater than the comparator value a (0.5) (comparison in 13) the valves are controlled so as to reduce pressure (18). In 19 the length of the pressure maintenance phase following this pressure reduction is determined which is realized in the "reacceleration of the wheel" condition. In the following sensing cycle the algorithm is in the "pressure reduction" condition.

If $P_y < 0.5$ it is checked in 14 whether $P_y = 0$ and if this is the case, it is checked in 15 whether the current maintenance phase covers a minimum time $T_{HMIN}$. If this also applies the valves are actuated via 16 with a pulse in pressure build-up position. In 17 the actual slippage value $\lambda$ (realized as being stable) is stored; furthermore, the number of build-up pulses within a control cycle $I_{puls}$ is incremented by 1. The algorithm remains in the "stability check" condition.

However, if $P_y$ was not 0 or $T_H$ is not greater than $T_{HMIN}$ a pressure maintenance signal is supplied in both cases at output 20. The algorithm remains in the "stability check" condition.

Time $T_{HMA}$ can be a function of the pulses in the current, pulsed build-up phase (e.g. $T_{HMA} = T_1 - I \Delta T_1$, wherein $T_1$ and $\Delta T_1$ are constants and I is the pulse number).

FIG. 4 is a flow chart for effecting the pressure reduction. This logic path is covered when instability was realized in the "instability check" condition during the preceding sensing as long as V does not exceed the value $b_2 \approx 0$ or $\lambda \leq \lambda_s + \Delta\lambda_2$ is not fulfilled (33), i.e. when the instantaneous slippage $\lambda$ exceeds the slippage value $\lambda_s$ which was last realized as being stable by more than $\Delta\lambda_3$. Furthermore, the values must not fall below $\lambda_s$ (34). If, however, the conditions 32–34 are positively fulfilled the control is direct towards pressure maintenance (35). After pressure reduction is completed a signal is set in 35; in the subsequent sensing step the algorithm is in the "reacceleration of the wheel" condition. If another negative V measured later on for the first time, the reference acceleration $b_x$ and the reference speed $V_{Ref}$ are updated.

FIG. 5 describes the generation of the first maintenance phase after pressure reduction. It is the object of this maintenance phase to reduce the actual slippage $\lambda$ to the slippage value $\lambda_s$ which was last realized as still being stable and, furthermore, to prevent the reference speed from "sliding down;" i.e. an unacceptable decrease. A further pressure reduction is the result of very high slippage values after a $\mu$bounce (42) as well as of a further differential delay $V < b_1$ (41) caused by an intermediately occurring $\mu$change. Too high positive wheel accelerations (43) which can be caused by valve idle times are reduced by inserted build-up pulses (45).

If the cases described do not occur time lapses until $\lambda_s$ is almost reached again in 46. A waiting time $T_{HMA}$ required for correction of a "sliding down" reference speed is observed in addition; said time, as already mentioned, can be a function of the number of build-up pulses.

When in equation 35 the signal S of a wheel was set and when this is subsequently followed again for the first time by a value $V < 0$ for the respective wheel, the values $b_x$ and $V_{Ref}$ can be corrected. They are calculated as follows:

$$b_{x\ new} = (1 - S_{Bref}) * b_{x\ old} + S_{Bref} * (V_{anp(k)} - V_{anp(k-1)}) / \tan p, \quad (5)$$

$$V_{Ref\ new} = (1 - S_{Vref}) * V_{ref\ old} + S_{Vref} * V_{anpk}; \quad (6)$$

wherein $b_{x\ new/old}$ are, respectively, the corrected and the present vehicle acceleration, $V_{Ref\ new/old}$ are, respectively, the corrected and the present vehicle speed, $V_{anp(k)/(k-1)}$ is, respectively, the speed at the actual and past adjusting point, $t_{anp}$ is the time elapsed since the last adjusting point, and $S_{Bref}$, $S_{Vref}$ are constants.

The values $b_{x\ new/old}$ and $V_{Ref\ new/old}$ commonly apply to all controlled wheels, the values $V_{anp(k)/(k-1)}$, $t_{an(p)}$ must be individually determined for each wheel.

The vehicle deceleration $b_x$ determined in (5) is subsequently limited to a value range of, for example, $$[-9 m/s^2, 0 m/s^2]$$

The equation (5) can be omitted when $b_x$ is measured directly. If a wheel speed exceeds the reference speed, the reference speed is incremented so as to match this wheel speed. For continuing $V_{Ref}$ between the adjusting times the equation $$V_{Ref\ new} = V_{Ref\ old} + b_x \Delta t \quad (7)$$

is used for extrapolating. $\Delta t$ is a sensing interval length.

We claim:

1. An anti-skid brake control system for a motor vehicle having at least one road wheel, said system comprising a speed sensor associated with said at least one wheel for producing a circumferential wheel speed signal $V_R$, means for determining a vehicle acceleration $b_x$, brake pressure control means for reducing the brake pressure, maintaining the brake pressure constant for a maintenance phase, and increasing the brake pressure in pulsed increments, evaluation circuit means responsive to said wheel speed signal $V_R$ for determining a wheel acceleration $V_R$, an acceleration difference $V = V_R - b_x$, an actual wheel slippage $\lambda$, a stable wheel slippage $\lambda_s$, and a slippage difference $\Delta\lambda = \lambda - \lambda_s$, said evaluation circuit means generating a stability criterion $P_y = \alpha(b_1 - V)(\Delta\lambda - \Delta\lambda_1) + \beta(\Delta\lambda - \Delta\lambda_1)$ during a maintenance phase following a pulsed increment, where $\alpha$, $\beta$, $b_1$, and $\Delta\lambda_1$ are constants, said evaluation circuit means producing control signals which cause said brake pressure control means to (1) increase brake pressure by a pulsed increment when at least one of $\Delta\lambda < \Delta\lambda_1$ and $V > b_1$ occurs;

(2) further maintain the brake pressure constant when $0 < P_y < a$, where a is a constant; and (3) reduce the brake pressure when $P_y > a$.

2. The anti-skid brake control system defined in claim 1, wherein said brake pressure control means is operative to maintain said brake pressure constant for a prescribed minimum maintenance time $T_{Hmin}$.

3. The anti-skid brake control system defined in claim 1, wherein said evaluation circuit means terminates said brake pressure reduction signal and produces a signal which maintains the pressure at a substantially constant level when $P_y$ is greater than a and the wheel acceleration V surpasses a positive acceleration value $b_2$ and the actual wheel slippage $\lambda$ does not exceed a slippage value $\lambda_2$ by more than a small prescribed value $\Delta\lambda_2$.

4. The anti-skid brake control system defined in claim 3, wherein said evaluation circuit means produces a signal effective to increase brake pressure in a first maintenance phase after a brake pressure reduction when the slippage difference $\Delta\lambda$ is less than $\Delta\lambda_1$.

5. The anti-skid brake control system defined in claim 4, wherein said signal effective to increase brake pressure is produced only after a minimum maintenance time $t_{HMIN}$.

6. The anti-skid brake control system defined in claim 4, wherein said evaluation circuit means produces a signal which reduces said brake pressure when at least one of the following occurs:

$$V < b_1 \text{ and}$$

$$\Delta\lambda > \Delta\lambda_2$$

7. The anti-skid brake control system defined in claim 4, wherein said evaluation circuit means produces a signal increasing brake pressure when $V > b_1$.

8. The anti-skid brake control system defined in claim 7, wherein said evaluation circuit means rapidly calculates a new vehicle deceleration $b_{x\ new}$ and a new vehicle reference speed $V_{Ref\ new}$, based upon the values $b_x$ and $V_{Ref}$ when $V < 0$ occurs after the brake pressure has been reduced.

9. The anti-skid brake control system defined in claim 1, wherein said evaluation circuit means terminates the signal for reducing brake pressure and produces a signal which maintains the pressure at a constant level when the actual wheel slippage $\lambda$ is less than the stable wheel slippage $\lambda_s$.

10. The anti-skid brake control system defined in claim 1, wherein said evaluation circuit means continuously corrects the vehicle reference speed $V_{Ref}$ in dependence upon the vehicle deceleration $b_x$ whenever the vehicle deceleration $b_x$ is determined.

* * * * *